United States Patent
Rohleder et al.

(10) Patent No.: US 10,120,713 B2
(45) Date of Patent: Nov. 6, 2018

(54) HARDWARE CONTROLLED INSTRUCTION PRE-FETCHING

(71) Applicant: FREESCALE SEMICONDUCTOR, INC., Austin, TX (US)

(72) Inventors: Michael Rohleder, Unterschleissheim (DE); Stefan Singer, Vaterstetten (DE); Jochen Gerster, Stuttgart (DE)

(73) Assignee: NXP USA, Inc., Austin, TX (US)

( * ) Notice: Subject to any disclaimer, the term of this patent is extended or adjusted under 35 U.S.C. 154(b) by 248 days.

(21) Appl. No.: 15/202,160

(22) Filed: Jul. 5, 2016

(65) Prior Publication Data

US 2018/0011736 A1    Jan. 11, 2018

(51) Int. Cl.
*G06F 9/48* (2006.01)
*G06F 9/38* (2018.01)
*G06F 12/0862* (2016.01)
*G06F 12/08* (2016.01)
*G06F 9/46* (2006.01)

(52) U.S. Cl.
CPC .............. *G06F 9/4881* (2013.01); *G06F 9/38* (2013.01); *G06F 9/3802* (2013.01); *G06F 9/3814* (2013.01); *G06F 9/3842* (2013.01); *G06F 9/46* (2013.01); *G06F 9/48* (2013.01); *G06F 9/4806* (2013.01); *G06F 9/4843* (2013.01); *G06F 12/08* (2013.01); *G06F 12/0862* (2013.01); *G06F 9/461* (2013.01)

(58) Field of Classification Search
None
See application file for complete search history.

(56) References Cited

U.S. PATENT DOCUMENTS

| 6,003,115 | A | 12/1999 | Spear et al. |
| 6,701,131 | B2 | 3/2004 | Kicklighter et al. |
| 2005/0138627 | A1* | 6/2005 | Bradford ................. G06F 9/463 |
| | | | 718/107 |
| 2005/0138628 | A1* | 6/2005 | Bradford ............... G06F 9/3802 |
| | | | 718/107 |
| 2014/0019689 | A1* | 1/2014 | Cain, III ............. G06F 12/0862 |
| | | | 711/136 |

FOREIGN PATENT DOCUMENTS

CN     1195812 A    10/1998

OTHER PUBLICATIONS

Wikipedia Encyclopedia, "Demand paging" : www.wikipedia.org/wiki/Demand_paging. Jan. 2, 2015.

* cited by examiner

*Primary Examiner* — Qing Yuan Wu (57) ABSTRACT

A task control circuit maintains, in response to task event information, a task information queue that includes task information for a plurality of tasks. Based upon the task information in the task information queue, a future task switch condition is identified as corresponding to a task switch time for a particular task of the plurality of tasks. A load start time is determined for a set of instructions for the particular task. A pre-fetch request is generated to load the set of instructions for the particular task into the memory circuit. The pre-fetch request is forwarded to a hardware loader circuit. In response to the task switch time, a task event trigger is generated for the particular task. The hardware loader circuit is used to load, in response to the pre-fetch request, the set of instructions from a non-volatile memory into the memory circuit.

19 Claims, 4 Drawing Sheets

HARDWARE CONTROLLED INSTRUCTION PRE-FETCHING

Aspects of various embodiments are directed to pre-fetching of a task, which can include instructions and embedded constant data, for tasks controlled by an operating system (OS).

Computer systems often benefit from a hierarchical memory design in which (partial) copies of the memory content can be stored (cached) at different levels within the memory hierarchy. Often, the hardware supporting the different memory levels has different capacities, costs, and access times. Generally speaking, smaller, faster memory circuits are located near the processor cores or other bus masters within the system and serve as caches for the main memory. Slower memories and especially the main memory are larger, but also relatively slow compared to those memories acting as caches. Some levels of this memory hierarchy may be located on the same semiconductor device as the processor cores or other masters, while other levels may be located on another semiconductor device. The information in main memory can be loaded from non-volatile memory circuits that can have even longer memory access times than the main memory.

Many OSs provide multi-tasking options that allow multiple different tasks to appear to be running concurrently on the same processor core, even though each processor core is only executing instructions ("software code" or just "code") for a single task at any given point in time. The appearance of simultaneous execution is provided by switching executing between the tasks, often before any particular task has completed its execution. The switching can be handled by a scheduler module that determines when to switch tasks and which task to switch.

A particular type of operating system has a task scheduler module (or just a "task scheduler") that provides a predictable consistency concerning the amount of time it takes to accept and complete an application's task. Such operating systems are sometimes referred to as real time operating systems (RTOS). Real time operating systems can be particularly useful in computer systems that have critical timing requirements (e.g., as often found in embedded systems that are used in the automotive industry). A particular important class of related RTOSs use a method called pre-emption, which interrupts a task being carried out by a computer system in order to switch to another task. The task switch can be carried out without requiring cooperation from the task being stopped and with the intention to resume execution of the stopped task at a later time. A RTOS having such a capability is usually called a pre-emptive RTOS.

These and other matters have presented challenges to efficiencies of computer system implementations, for a variety of applications.

SUMMARY

Various example embodiments are directed to issues such as those addressed above and/or others which may become apparent from the following disclosure.

In certain example embodiments, aspects of the present disclosure involve the use of a hardware circuit to generate pre-fetch requests to load task instructions into main memory, and determining a load start time for beginning the pre-fetch requests.

Consistent with some embodiments of the present disclosure, an apparatus is provided system for loading and executing a plurality of tasks under the control of an operating system (OS). The apparatus includes a computer processor circuit configured to execute software instructions for the OS and the plurality of tasks. A memory circuit is configured to store the software instructions and coupled to the computer processor circuit to provide the software instructions to the computer processor circuit. A hardware loader circuit is coupled to the memory circuit and configured to load software instructions into the memory. A task control circuit is coupled to the computer processor circuit and the memory circuit and configured to: maintain, in response to task event information, a task information queue that includes task information for the plurality of tasks; identify, based upon the task information in the task information queue, a future task switch condition corresponding to a task switch time for a particular task of the plurality of tasks; determine, based upon the task information and the task switch time, a load start time for a set of instructions for the particular task; generate, in response to the load start time, a pre-fetch request to load the set of instructions for the particular task into the memory circuit; forward the pre-fetch request to the hardware loader circuit; and generate, in response to the task switch time, a task event trigger for the particular task.

Embodiments of the present disclosure are directed toward a method for use with a computer processor circuit configured to execute software instructions stored in a memory circuit, and for an operating system (OS) and a plurality of tasks under control of the OS. The method includes: using a task control circuit coupled to the computer processor circuit and the memory circuit to: maintain, in response to task event information, a task information queue that includes task information for the plurality of tasks; identify, based upon the task information in the task information queue, a future task switch condition corresponding to a task switch time for a particular task of the plurality of tasks; determine, based upon the task information and the task switch time, a load start time for a set of instructions for the particular task; generate, in response to the load start time, a pre-fetch request to load the set of instructions for the particular task into the memory circuit; forward the pre-fetch request to a hardware loader circuit; and generate, in response to the task switch time, a task event trigger for the particular task. The method also includes using the hardware loader circuit to load, in response to the pre-fetch request, the set of instructions from a non-volatile memory into the memory circuit.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving hardware circuitry designed to generate pre-fetch requests for populating a main memory. In particular embodiments, the main memory can be located within the same semiconductor die as processor cores that execute instructions retrieved, in response to the pre-fetch requests, from a non-volatile memory that is located outside of the semiconductor die, whether or not the non-volatile memory resides in the same package. In certain implementations, aspects of the present disclosure have been shown to be beneficial when used in the context of pre-emptive real time OSs. In some embodiments, memory access latency of an external non-volatile memory circuit can be hidden through the use of memory pre-fetches that are scheduled based upon foreseeable task switch events that are controlled by a task scheduler module of the OS. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments of the present disclosure are directed toward a computer system that generates task pre-fetches to load task data, which can include instructions and any constant data, from an external non-volatile memory circuit into an internal, random access memory (RAM) circuit. Particular aspects relate to a hardware task control circuit that is integral to the pre-emptive task scheduling and that controls the timing of these pre-fetches based upon the task scheduling. The hardware task control circuit ensures that the pre-fetches begin soon enough for the instructions of a particular task to be loaded before the particular task is given control and allowed to execute within the OS environment.

Some embodiments of the present disclosure are directed toward a system-on chip (SoC) that has at least one processor core and a main memory circuit, such as a RAM circuit. The SoC includes a memory connection port that provides at least one data channel for accessing data from an external memory circuit, such as a non-volatile (flash) memory circuit that is located on a different semiconductor die. The accesses to the external memory circuit over this port are performed by a dedicated hardware circuit, which is referred to as the hardware (HW) loader circuitry. The HW loader circuitry responds to a pre-fetch request by loading data from the external memory circuit into a memory circuit internal to the SoC. The SoC is configured with an OS that uses a hardware control circuit that interfaces with task scheduler to provide pre-emptive multitasking capabilities. In addition to providing support for task switches, the hardware task control circuit uses scheduling information to identify tasks that will be run in the future. The hardware task control circuit then generates pre-fetch requests that populate the main memory circuit with instructions for the future tasks. The pre-fetch requests can be issued before the task transitions to a running status, e.g., while the task is not active. Examples of inactive states include, but are not limited to, a task being in a blocked, suspended, or ready status.

According to particular implementations, a task scheduler is called in response to a task scheduler event. The task scheduler event could be generated by the hardware task control circuit or in response to a task relinquishing control to the OS, or by an interrupt service routine requesting a task switch. For instance, the hardware task control circuit can generate a task scheduler event in response to scheduling timer or to a modification of a task property (e.g. a task priority change). The task scheduler, can then switch to the next task in the task queue.

According to certain embodiments, the hardware task control circuit can be configured to set one or more timers that identify both when to issue a pre-fetch and when to perform a task switch by calling the task scheduler. The hardware task control circuit can be configured to check for future task switch conditions that correspond to a particular task and a task switch time. The task switch time indicates a time at which the particular task is expected to be given control and allowed to execute. The hardware task control circuit accesses a task information queue to retrieve task information for the particular task, and determines, based upon the task information and the task switch time, a load start time for a set of instructions for the particular task. The load start time indicates when the pre-fetch requests are to be generated. When the load start time occurs, the hardware task control circuit generates a pre-fetch request that identifies the set of instructions (and constant task data) for the particular task. The pre-fetch request can be provided to a HW loader circuitry that retrieves the instructions (and any related constant data) from a non-volatile memory circuit and stores them in a random access memory circuit. As discussed herein, the pre-fetch request can identify instructions and data for the entire task or for just a portion of the task. When the task switch time subsequently occurs, hardware task control circuit can call the task scheduler in order to perform a task switch for the particular task.

Various aspects of the present disclosure relate to the ability of the task control circuit and the hardware loader circuit to operate in parallel with execution of the OS and tasks. For instance, the task control circuit can initiate pre-fetches without interrupting the execution of the OS or tasks. Moreover, the task control circuit can monitor for pre-fetch opportunities with a high level of granularity on the monitoring times. In particular, the task control circuit can continually check for future task switch events and generate times for corresponding load start times. The task control circuit can also immediately start a new pre-fetch operation upon finishing another the previous one, thus exploiting the maximum bandwidth provided by the external non-volatile memory. This checking can be carried out as quickly as the task control circuit is able operate without suffering from a penalty that would otherwise result from interrupting the execution of OS and tasks.

Figure 1:
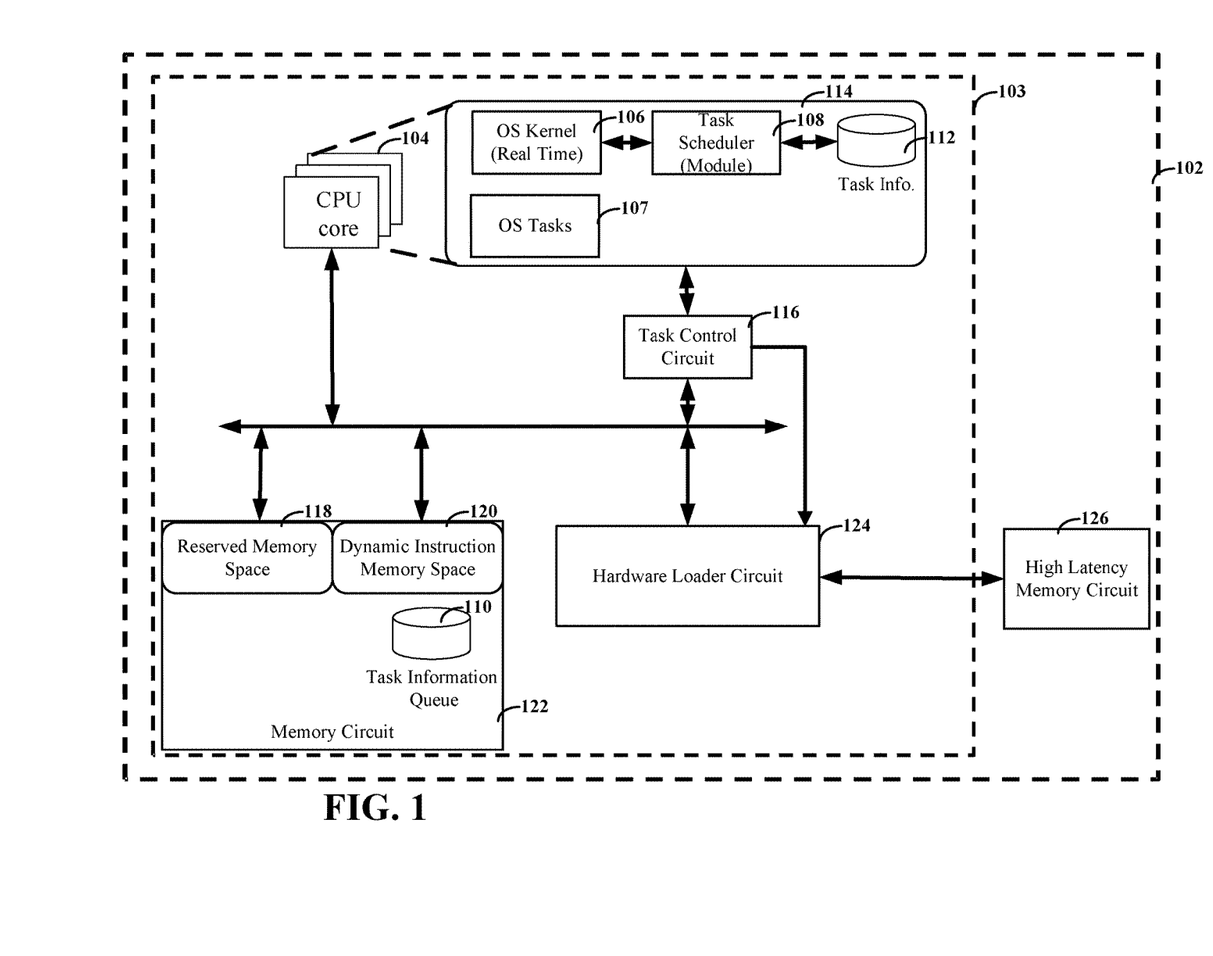
FIG. 1 depicts a block diagram for a computer system, consistent with embodiments of the present disclosure.

Turning now to the figures, FIG. 1 depicts a block diagram for a computer system, consistent with embodiments of the present disclosure. A computer processing device 102 is part of computer system, and includes various computer circuits. In particular embodiments, the computer processing device 102 is an SoC that includes multiple circuits within a single integrated circuit (IC) chip, or a System in Package (SiP) 102 that includes multiple chips within a single IC package. SoCs and SiPs can be particularly useful for embedded applications where factors such as physical size, power, and cost are limiting. In certain embodiments, the circuits in the computer processing device 102 can be implemented on multiple IC chips and IC packages.

The circuits of computer processing device 102 can include one or more circuits and semiconductor dies. For example, a semiconductor die 103 can include one or more central processing unit (CPU) cores 104. Each CPU core 104 is connected to one or more memory circuits 122. In particular embodiments, memory circuit 122 can be volatile memory that serves as the main memory for the CPU cores 104. Instructions and data are copied into main memory to allow access by the CPU cores 104. As discussed herein, the instructions can be loaded from a non-volatile memory circuit 126 that is not directly accessible by the CPU cores (or other master devices). In particular, instructions and data are stored on one or more high-latency, non-volatile memory circuits 126 and the content of the memory circuits 126 is only indirectly accessible (by way of hardware loader circuitry 124 loading data in to memory circuit(s) 122).

The memory circuit(s) 126 are depicted as being located on the SiP 102, however the memory circuit 126 can also be external to the SiP 102. Memory circuit 126 provides non-volatile storage with a latency that is relatively high when compared to the latency of the memory circuit 122. In particular embodiments, memory circuit 126 is a programmable read-only memory (PROM) that CPU cores 104 do not have write access to during normal operation. In this manner, the instructions and a data stored therein are constant with a set size and location that are known throughout execution by the OS. The memory circuit (s) 126 can, in some embodiments, be programmable through a separate interface (e.g., as part of a firmware update procedure).

The instructions and constant data can be copied to memory circuit 122 so that they can be subsequently accessed by CPU cores 104. In certain embodiments, analog and input/output (I/O) circuits can provide additional data to the CPU cores 104. The I/O circuits can, for example, provide data from various sensors to the CPU cores 104, and provide data from the CPU cores 104 to output circuits. In the automotive environment, as a possible example, the inputs could be from temperature sensors (or other types of sensors), or vehicle controls (e.g., brake pedal). The outputs could be warning indicators (e.g., faulty engine light) or safety circuits (e.g., engine shutoff).

According to embodiments of the present disclosure, the CPU cores 104 can be configured to access data stored in memory circuit(s) 122 according to an OS environment 114. The OS environment 114 is controlled by the OS kernel 106. In particular embodiments, the OS kernel 106 is a real time OS kernel that includes a task scheduler 108 with pre-emptive task scheduling for OS tasks 107 under the control of the OS and executed by CPU cores 104 (e.g., using time slicing or priority based scheduling). The task scheduler 108 accesses task information 112, which can be implemented by a table, list or queue of task control blocks (TCBs) or entries that refer to such information. The task information queue 112 contains information about tasks that is used by the task scheduler 108 to perform task switches. During a task switch operation, the state information, or execution context data, for a current task can be stored for future use. The state information can include, among other things, the CPU register contents and the stack.

According to various embodiments of the present disclosure, the CPU cores 104 retrieve instructions for a particular task from the memory circuit 122, but the memory circuit 122 is not large enough to store instructions for every possible task, as stored in the comparatively large non-volatile memory circuit 126. Accordingly, the computer processing device 102 can be configured to use virtual memory that allow for the effective memory space to be extended beyond the physical size of the main memory, as provided by the memory circuit 122. The OS handles the copying of instructions from the memory circuit 126 to the memory circuit 122 so that they can be executed by the CPU cores 104. The mapping of the virtual addresses used by the CPU cores 104 to the physical addresses used by the memory circuit 122 can be performed by a memory management unit functionality. For this purpose an available memory management unit (not shown) can be used, or a specific, dedicated memory management functionality can be implemented as part of the access path to the memory circuit 122.

According to various embodiments of the present disclosure, the use of task control circuitry 116 to generate pre-fetch requests that are sent to the hardware (HW) loader circuitry 124 can be effective at hiding latency associated with a slow non-volatile memory circuit 126 and maximize the usage of the available bandwidth provided by this memory circuit. In particular, the HW loader circuitry 124 can load task data (instructions and possibly constant data) into the memory circuit 122 before executing the task that requires access to the task data. In certain situations, it is possible that access to task data is required before the task data has been loaded from the non-volatile memory circuit 126. For example, an unexpected task switch event might result in a task attempting to execute before a pre-fetch and loading of the task data is possible. This might happen, for example, in response to an interrupt event that causes an unexpected task switch. As another example, the time required to completely load future task data from non-volatile memory circuit 126 might be greater than the execution time for tasks executing before the future task data. This results in the executing tasks completing before the future task data can be loaded by the HW loader circuitry 124. Such situation can cause an error condition that causes some hardware reaction (page fault) upon accessing a not yet loaded task data; which itself may be processed by an operating system.

Consistent with embodiments of the present disclosure, a task control circuit 116 is used to generate task pre-fetch requests for copying data from non-volatile memory circuit 126 to memory circuit 122 before the data is required by the OS and running tasks. The pre-fetch requests each specify a set of instructions (and related constant data) for a particular task and result in the corresponding set of instructions being loaded from the non-volatile memory circuit 126 into the memory circuit 122. The requests are considered pre-fetches because they are generated before the CPU cores 104 attempt to access the corresponding set of instructions from the memory space of the computer processing device 102. In this manner, page faults can be avoided by pre-emptively loading instructions into the memory circuit 122.

In specific embodiments of the present disclosure, the task control circuit 116 identifies future tasks for execution based upon the information stored in the task information queue 110. The task control circuit 116 can then determine whether or not the instructions for the future tasks currently reside in the main memory. For example, the task control circuit 116 can maintain a lookup table specifying the memory location for the corresponding instructions. For tasks that do not currently reside in main memory, the task control circuit 116 determines a load start time for a set of instructions for the particular task. The load start time is then used as an indication for when a pre-fetch request is generated. The task control circuit 116 then sends the pre-fetch request to the HW loader circuitry 124, which begins loading instructions from memory circuit 126 into the main memory of memory circuit 122. Such embodiments can be beneficial in ensuring instructions and data for a particular task are loaded before the task is about to execute; which is in particular beneficial to avoid page fault situations and corresponding latencies that might arise when the loading is started on demand (upon detection of a page fault).

According to various embodiments, the OS environment 114 can include a task scheduler module 108 that is configured to implement task switches. The task switches can be initiated by the task control circuit 116 (e.g., through the use of interrupts or setting values in one or more control registers), within an interrupt service routine or by the OS in response to a task relinquishing control to the OS. The task scheduler module 108 can carry out a task switch using task information 112, which might be stored as part of a TCB table or other data structure.

Consistent with some embodiments, a single task can be broken in multiple load requests (load operations), which are then serially performed. The address range for the instructions (and constant data) in each load operation is referred to as a "loader entity" having a size corresponding to a particular memory address range of the load operation (a "load size"). Each loader entity contains a respective and different subset of the set of instructions and data for the task; or is equivalent to the set of instructions and data of the task. According to some embodiments, the task control circuit 116 performs the serialization by generating separate pre-fetches for multiple loader entities within a single set of task data. For this purpose the task control circuit 116 can use and maintain a dedicated task information queue 110, which may contain additional information for a task, and also information about the corresponding loader entities. This task information queue (or portions of the queue) may be loaded by the task control circuit 116 into internal memory (registers) for further processing.

In certain implementations, the task information queue 110 contains a duplicate copy of at least some of the task information 112. In some embodiments, consistency of data between the task information queue 110 and the task information 112 can be maintained by some software functionality (e.g., by the OS). For instance, a software module that is integrated within the OS can monitor for changes in one of the data locations and update the other location accordingly. In embodiments of the present disclosure, synchronicity of shared data can be implicitly maintained by allowing the task control circuit 116 to directly access the task information that is updated and maintained by the OS.

The hardware loader circuit 124 need not be aware of the serialization of a task into multiple loader entities and can simply respond to pre-fetches by loading the corresponding data into memory circuit 122. In various embodiments, the hardware loader circuit 124 can perform this serialization. For example, the task control circuit 116 provides a single pre-fetch for the entire address range of the task data. The hardware loader circuit 124 generates separate load requests for multiple loader entities within the address range.

Accordingly, the load size may be smaller than the total size of a particular task, and subsequently, a task may be broken into multiple loader entities. For example, a particular task may have a set of instructions that span ten pages of memory. The size of the first loader entity of this task may correspond to an address range that spans three pages of memory. The first data in the first loader entity can be selected based upon the instructions that are expected to be first executed when the particular task begins (or resumes) execution. The task control circuit 116 then generates an instruction pre-fetch requests for the three memory pages related to this first loader entity.

To accommodate a loading size with a granularity smaller than an entire task, the task control circuit 116 can be configured to generate load times for load operations corresponding to the particular loader entity size; which might vary for the loader entities within one task. In this manner, the task control circuit 116 might create several, additional load times for a single task. According to particular embodiments, the load size can be set according to an expected task switch frequency. For instance, if the task scheduler uses time slicing, the load size could be set to match a number of instructions that is related to a single time slice.

In certain embodiments, memory circuit 122 includes two memory spaces, dynamic instruction memory space 120 and reserved memory space 118. Both memory spaces store instructions for tasks, but dynamic instruction memory space 120 is configured to allow for different sets of instructions to be loaded from the non-volatile memory circuit 126 by the HW loader circuitry 124. Reserved memory space 118 can store sets of instructions that are static and that the hardware loader circuit 124 is not able to evict. For example, the reserved memory space 118 can store instructions that require very small latency for their execution, and are relatively small. In particular, reserved memory space 118 can store instructions for interrupt service routines or functions where response time is critical. Because the reserved memory space 118 is not subject to changes from the hardware loader circuit 124, the memory space can be directly mapped into the memory circuit 122 when accessing the reserved memory space 118. It is also possible that the OS can use virtual memory addressing for the reserved memory space 118.

Figure 2:
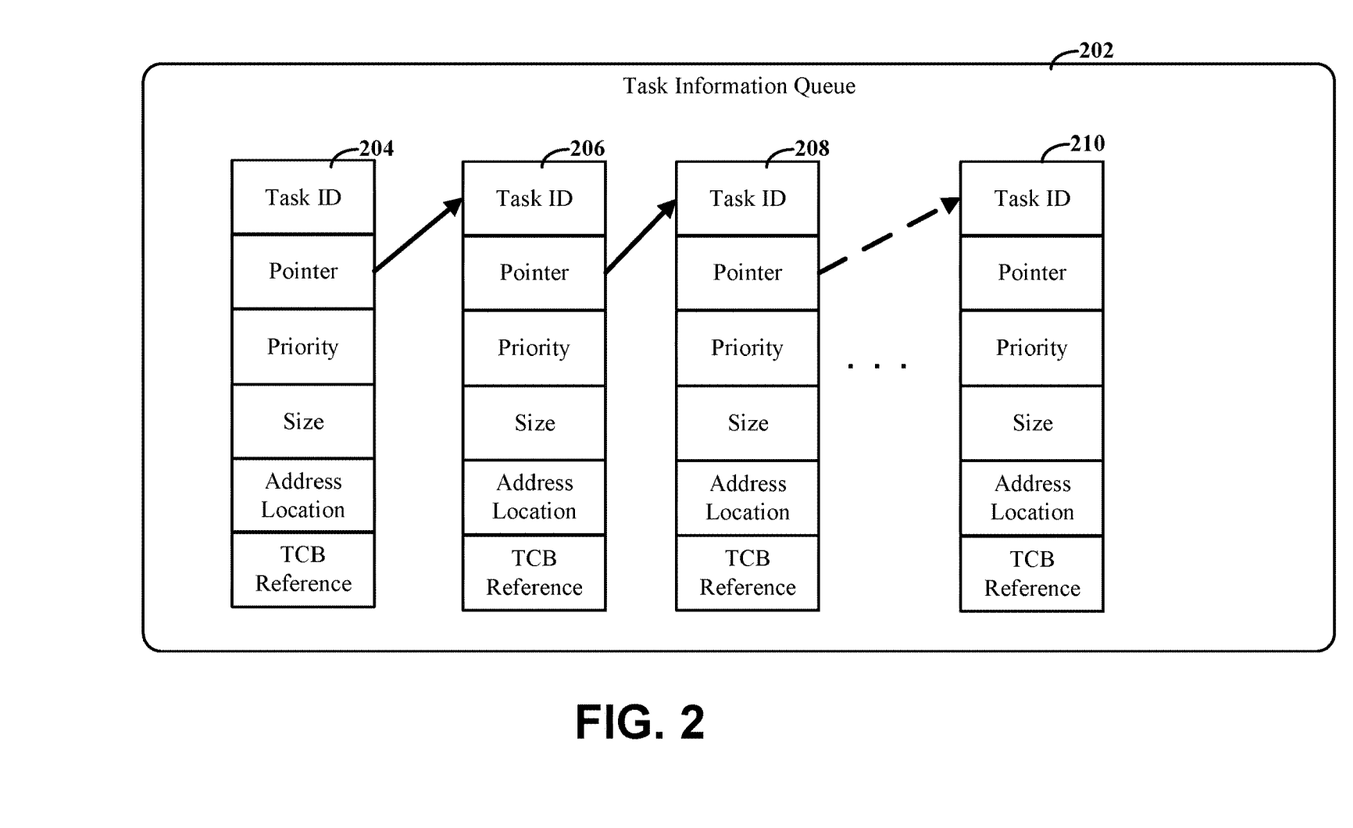
FIG. 2 depicts a logical representation of a task information queue, consistent with embodiments of the present disclosure.

FIG. 2 depicts a logical representation of a task information queue, consistent with embodiments of the present disclosure. In particular embodiments, the task information queue 202 contains task information entries 204, 206, 208, and 210, which each contain data describing a corresponding task. The task information queue 202 can include information that specifies address locations for task data within the non-volatile memory circuit. Moreover, the task information queue 202 can be a copy of (either directly or indirectly through a reference to another data structure) task information that is used by the OS for task-related operations. The task-related operations can include, but are not limited to, modifications that change the task scheduling order.

In some embodiments, the task information queue 202 can be implemented within a TCB queue structure, which allows the reuse of overlapping data fields between the TCB queue structure and the task information queue 202. In other implementations, a separate data structure can be used for the task information queue 202. The OS and task control circuit can also make use of additional information about the task that is not within the task information queue 202. If the additional information is within a TCB queue structure, for example, the task information queue 202 can include a TCB reference. The TCB reference can be a value that is used as an index to retrieve the task information from the TCB queue structure. Other types of tables and data structures and could also be used to provide additional information. Moreover, indirect indexing could be done using, for example, the task ID to find the appropriate information.

Each task information entry is shown as including a task identification (ID) The task ID can uniquely identify each task. A pointer can provide an indication of the next task to be executed. The depicted task information queue 202 is configured as a linked-list of task entities, with the last pointer indicating the end of the list (e.g., using a NULL value).

Additional information for the task that can also be stored in the task information queue 202 includes a priority of the task, and an address location(s) for the instructions of the task. The address location information specifies a start address and an end address. The start and end addresses can be specified in several different manners. For example, the start address can be stored as a specific address location ("A"), while the end address location ("B") can be inferred from a size ("N") that corresponds to the amount of instructions and constant data. The actual end address is then determined as B=A+N, wherein N corresponds to the addressable granularity of the non-volatile memory circuit. Alternatively, both the start and end address can be directly specified with corresponding addresses. It might also be possible to directly specify the end address (B), while inferring the start address from a provided size: A=B−N. The particular examples of task entry information are not limiting. For example, a task entry can store process control information, such as process state, process privileges, CPU registers used by the task, and a program counter or further optional information.

The task control circuit 116 can access the task information queue 202 and identify the next task that is scheduled to be called. The task control circuit 116 can also determine whether or not the next task already resides in the main memory. If not, the task control circuit 116 then determines the load time based upon the amount of data that is to be loaded into main memory for the particular task and an expected execution time, or execution time range, for the particular task. The load time determination can be carried out not only for the next to be called task, but also for the next n to be called tasks. Increasing the size of n can reduce the likelihood of pre-fetches not being completed in time for execution. It is noted that increasing the size of n can also increase the adverse effects of wrong predictions on task execution order. Other considerations for setting the value of n are also possible.

Figure 3:
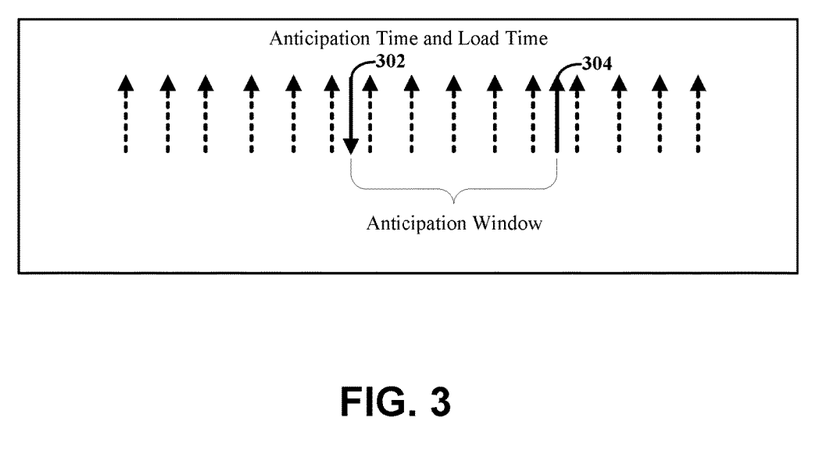
FIG. 3 is a timing diagram that depicts scheduling timings and loading timings, consistent with embodiments of the present disclosure.

FIG. 3 is a timing diagram that depicts anticipation time relative to a load time, consistent with embodiments of the present disclosure. To provide a frame of reference, each dotted arrow represents a time point during which the task scheduler may be called if the OS were implementing all task switching events. For instance, an OS might use a timer to create a periodic call of a task scheduler; alternatively or additionally the task scheduler may be called upon certain events of the OS, e.g. when a task state change is requested, a task relinquishes control because it needs to wait for a resource or event, etc. Each time the task scheduler module is called system resources are consumed, including processing time of the CPU core executing the task scheduler module. When the task scheduler module is called at higher and higher frequencies the granularity at which task switches occur improves; however, the amount of system resources consumed can also increase, which leads to less resources available for the execution of tasks.

Embodiments of the present disclosure are directed toward the use of hardware circuit(s) to support at least some of the task switching and scheduling functions. This can be particularly useful for providing task switching control and pre-fetching without consuming significant amount of system resources that must be shared with executing tasks. In particular, a task control circuit can determine, using a timer, whether a task switch should be carried out to allow a different task to execute on a CPU core. The task control circuit can also identify the next task to be called in order to determine a load time. For example, the task control circuit can identify a next task in the task information queue. The task control circuit then identifies a task switch time (start time) for the next task as indicated at solid arrow 304. Since the switch time is not related to a specific periodic timer event (as is often used for calling an OS task scheduler module) a higher accuracy for the scheduling of the task switch operation can be achieved.

The task control circuit then determines a load anticipation time or window for the data loading operation associated with the identified task. For situations in which the entire task data is to be loaded (as opposed to a load size that is smaller than the entire task data), the anticipation window can be calculated by taking the time for each load operation (e.g., time to read an instruction from the external memory) and multiplying this load time by the number of transactions necessary to load the entire task. In some instances, the starting address of the task instructions is taken into account to determine the number of necessary transactions. For example, the total size of a block of instructions for a task might be small enough to fit within three pages when properly aligned with the start of the pages, but the task would reside in four pages depending upon the actual alignment of the block of instructions relative to the memory pages.

The task control circuit then sets a load start time event at the time indicated at position 302. In the depicted example, position 302 is determined by subtracting the anticipation window from to the earliest possible start time for the task. This helps to ensure that the task instructions have been loaded into main memory before the task begins execution. In some embodiments, an additional time can be added to the anticipation window to provide a margin of error between the actual load start time and the expected load start time. Other embodiments may implement some status feedback from the hardware loader circuit 124 to the task control circuit 116 upon finishing a pre-fetch operation. The feedback can allow the task control circuit 116 to immediately generate a request for the next pre-fetch operation and thus exploit the available bandwidth for the load operation.

Figure 4:
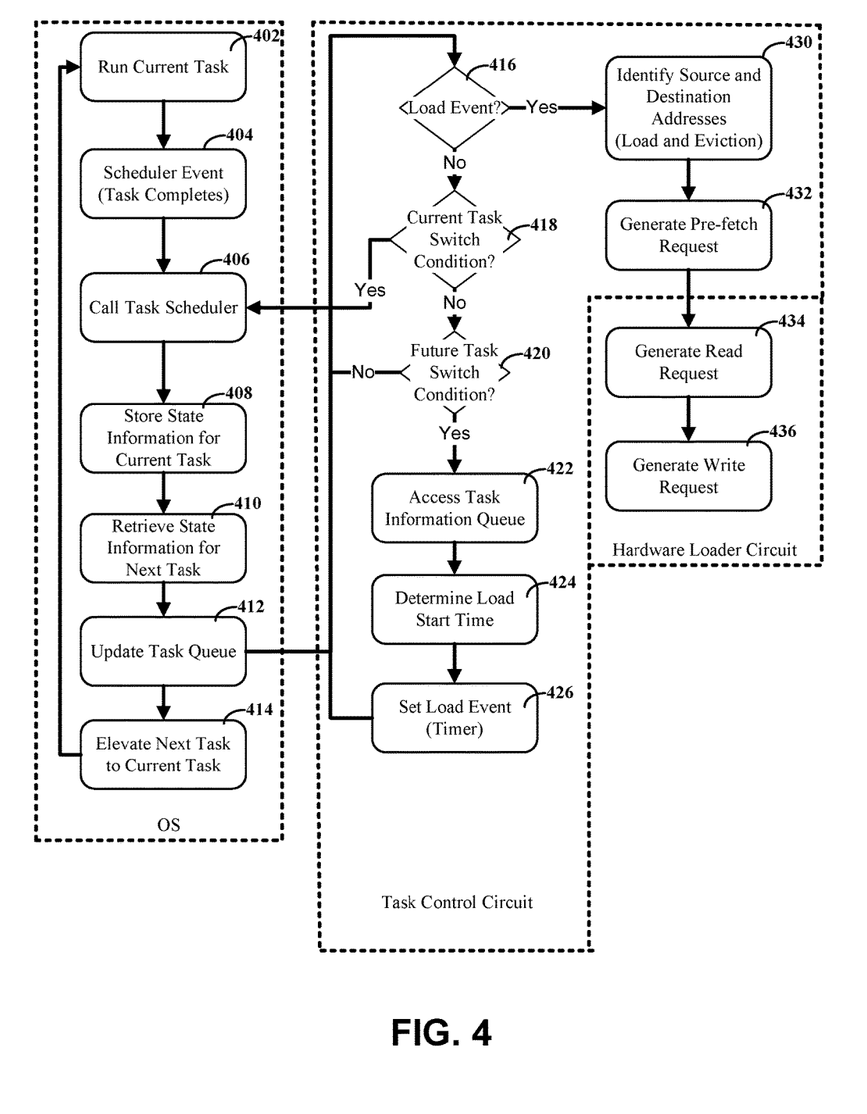
FIG. 4 is a flow diagram for handling task scheduling and task loading, consistent with embodiments of the present disclosure.

FIG. 4 is a flow diagram for handling task scheduling and task loading, consistent with embodiments of the present disclosure. The flow diagram is partitioned into three different sections according to whether the flow is implemented by the OS (including the task scheduler module), the hardware task control circuit, or the hardware loader circuit. A currently active task can continue to execute or run, per block 402, until a task scheduler event occurs, as indicated by block 404. As discussed herein, much of the task scheduling control can be implemented within the task control circuit. As such, the task scheduler event at block 404 can correspond to a task relinquishing control to the OS, while other task scheduling events can be handled by the task control circuit. The OS then calls a task scheduler, per block 406.

The calling of the task scheduler indicates that a new task should be given control by performing a task switch operation. The task scheduler module can perform the task switch operation by storing the state information for the current task in the task information queue, per block 408. The state information can include CPU register contents, program counter contents, and other information for allowing the task to be gracefully restarted at a later time. The task scheduler module then retrieves state information for the next task from the task information queue, per block 410. The task information queue can then be updated based upon the changes flowing from the task switch operation, per block 412. This can include elevating the status of the next task to active and placing the current task at a new location within the task information queue. The next task is then elevated to the active task by updating the CPU core registers and the OS, per block 414.

According to certain embodiments, the task control circuit can determine whether or not there is a load event, per block 416. For example, the task control circuit can set timers for load events. A load event might also be directly triggered upon receiving a task status update (per block 412), such as when a request to activate the highest priority task is received. When a timer expires, the task control circuit can determine which task (or tasks) is associated with the timer event and the corresponding source and destination addresses for the associated task, per block 430. The determination can include accessing the task information queue to retrieve information about the current address range for the set of instructions and constant data. Using the source and destination locations (physical addresses) for copying the set of instructions into main memory, the task control circuit then generates one or more instruction pre-fetch requests, per block 432.

In some instances, the pre-fetch requests encompass all instructions for the task. In other instances, the pre-fetch requests cover a set of instructions corresponding to a load size, which can be less than all of the instructions for the task. The transfer itself can be performed by an independent hardware circuit, the hardware loader circuit, which can generate read requests to a non-volatile memory, per block 434. The hardware loader circuit then generates write requests to the main memory to store the retrieved data, per block 436. When there is more than one pre-fetch request, the task control circuit may generate multiple pre-fetch requests until all pre-fetch requests have been provided to the hardware loader circuit, which can queue the pre-fetch requests until they are completed. In other instances, the task control circuit can provide a single pre-fetch request that the hardware loader circuit separates into multiple loader entities, which can be queued and serially processed.

The task control circuit can also check for current task switch conditions (e.g., by detecting the expiration of a timer), per block 418. If a current task switch condition is detected, the task control circuit can trigger the calling of the task scheduler to perform a task switch. For example, the task control circuit can generate an interrupt or setting a register value. The OS can respond by calling the task scheduler, per block 406. The determination of block 418 can be carried out in a manner that is substantially independent from the decisions corresponding to blocks 416 and 420. For example, the determination of block 418 can be carried out in at the same time, before or after the determinations in blocks 416 and 420.

The task switch condition identified in block 420 can correspond to a future task switch event as determined by the task control circuit. For instance, the task control circuit can access the task information queue and identify that there are additional tasks waiting to execute. The future task switch condition can correspond to various types of preemption events, such as a task having a higher priority than other tasks in the queue (and potentially the currently running task), and a time slice window. For instance, the task control circuit can identify an expiration time for a time slice as a future switch condition. The task control circuit can determine which task is going to be called for the future switch condition based upon information stored in the task information queue, per block 422. This can include obtaining information about the task size and location in order to determine the number of load operations that are required to load the task into main memory.

The task control circuit then determines a load start time, per block 424. The load start time can be based upon the expected execution start time of the next task and the anticipation window. As discussed herein, the anticipation window can correspond to the amount of time required to load the instructions for the task into main memory using pre-fetches. A load event can then be set, per block 426. The load event indicator can be, for example, a timer or time stamp that indicates when the corresponding pre-fetches should be started.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The Specification describes and/or illustrates aspects useful for implementing the claimed disclosure by way of various circuits or circuitry which are discussed in the context of terms such as blocks, modules, and tasks. Such circuits or circuitry are used together with other elements. The circuit structure is exemplified through a discussion of the related embodiments and the corresponding structures, steps, functions, operations, activities, etc. For example, in certain of the above-discussed embodiments, one or more illustrated items in this context represent circuits (e.g., CPU circuit, discrete logic circuitry or (semi-)programmable circuits) configured and arranged for implementing these operations/activities, as may be carried out in the approaches shown in FIG. 4. In certain embodiments, one or more computer processing circuits or CPUs are configured by way of memory circuitry that stores software code (program to be executed as a set/sets of instructions) for performing a specific set of operations.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A system for loading and executing a plurality of tasks under the control of an operating system (OS), the system comprising:
   a computer processor circuit configured to execute software instructions for the OS and the plurality of tasks;
   a memory circuit configured to store the software instructions and coupled to the computer processor circuit to provide the software instructions to the computer processor circuit;
   a hardware loader circuit coupled to the memory circuit and configured to load software instructions into the memory circuit; and
   a task control circuit coupled to the computer processor circuit and the memory circuit and configured to:
     maintain, in response to task event information, a task information queue that includes task information for the plurality of tasks;
     identify, based upon the task information in the task information queue, a future task switch condition corresponding to a task switch time for a particular task of the plurality of tasks;
     determine, based upon the task information and the task switch time, a load start time for a set of instructions for the particular task by being further configured to:
       determine a load anticipation time for the particular task as a function of a size of the set of instructions and access time for a non-volatile memory circuit configured to store the set of instructions, and
       subtract the load anticipation time from the task switch time to result in the load start time;
     generate, in response to the load start time, a pre-fetch request to load the set of instructions for the particular task into the memory circuit; and
     forward the pre-fetch request to the hardware loader circuit.

2. The system of claim 1, wherein the OS is designed to maintain a set of task information in the memory circuit and wherein at least some of the task information in the task information queue is a copy of the task information maintained by the OS.

3. The system of claim 2, wherein the task information queue contains additional data not present in the set of task information maintained by the OS.

4. The system of claim 2, wherein the task control circuit is configured to maintain consistency between the task information queue and the task information maintained by the OS by being further configured to implement at least one of:
   directly access the memory circuit and the task information maintained by the OS; and
   invoke software code within the OS to access the memory circuit and the task information maintained by the OS.

5. The system of claim 1, wherein the task control circuit is further configured to generate, in response to the task switch time, a task event trigger for the particular task, wherein the task event trigger for the particular task includes at least one of a generated interrupt and a set register value for a register accessible by the computer processor circuit.

6. The system of claim 1, wherein the hardware loader circuit is configured to serialize load requests for the pre-fetch request by generating a series of individual load requests for the set of instructions.

7. The system of claim 1, wherein the task control circuit is configured to generate multiple pre-fetch requests each containing a respective and different subset of the set of instructions.

8. The system of claim 1, wherein the task control circuit is configured to identify the future task switch condition by determining that a priority for the particular task is higher than a priority for other tasks in the task information queue.

9. The system of claim 1, wherein the task control circuit is configured to identify the future task switch condition by identifying an expiration time for a time slice; and determining that the particular task is assigned to a subsequent time slice.

10. The system of claim 1 wherein the OS is a real time OS; the computer processor circuit is located on an integrated circuit (IC) die and wherein the hardware loader circuit is configured to retrieve the set of instructions from a non-volatile memory circuit is a programmable read-only memory and external to the IC die.

11. The system of claim 10, wherein the task information queue includes task entries that specify a start address location and an end address location for the set of instructions in the non-volatile memory circuit.

12. A method for use with a computer processor circuit configured to execute software instructions stored in a memory circuit and for an operating system (OS) and a plurality of tasks under control of the OS, the method comprising:
   performing, by a task control circuit coupled to the computer processor circuit and the memory circuit:
     maintaining, in response to task event information, a task information queue that includes task information for the plurality of tasks;
     identifying, based upon the task information in the task information queue, a future task switch condition corresponding to a task switch time for a particular task of the plurality of tasks;
     determining, based upon the task information and the task switch time, a load start time for a set of instructions for the particular task by:
       determining a load anticipation time for the particular task as a function of a size of the set of instructions and access time for a non-volatile memory circuit configured to store the set of instructions, and
       subtracting the load anticipation time from the task switch time to result in the load start time;
     generating, in response to the load start time, a pre-fetch request to load the set of instructions for the particular task into the memory circuit;
     forwarding the pre-fetch request to a hardware loader circuit; and
     generating, in response to the task switch time, a task event trigger for the particular task; and
     using the hardware loader circuit to load, in response to the pre-fetch request, the set of instructions from a non-volatile memory into the memory circuit.

13. The method of claim 12, further comprising, maintaining, by the OS, a set of task information in the memory circuit and wherein at least some of the task information in the task information queue is a copy of the task information maintained by the OS.

14. The method of claim 13, wherein the task information queue contains additional data not present in the set of task information maintained by the OS.

15. The method of claim 13, further comprising using the task control circuit to maintain consistency between the task information queue and the task information maintained by the OS by at least one of:
   directly accessing the memory circuit and the task information maintained by the OS; and
   invoking software code within the OS to access the memory circuit and the task information maintained by the OS.

16. The method of claim 12, wherein the generating the task event trigger for the particular task includes at least one of: generating an interrupt and setting of a register value that is accessible by the computer processor circuit.

17. The method of claim 12, further comprising using the hardware loader circuit to serialize load requests for the pre-fetch request by generating a series of individual load requests for the set of instructions.

18. The method of claim 12, further comprising using the task control circuit to generate multiple pre-fetch requests each containing a respective and different subset of the set of instructions.

19. The method of claim 12, further comprising using the task control circuit to identify the future task switch condition by determining that a priority for the particular task is higher than a priority for other tasks in the task information queue.

* * * * *